US012073753B2

(12) United States Patent
Lin

(10) Patent No.: US 12,073,753 B2
(45) Date of Patent: Aug. 27, 2024

(54) METHOD AND SYSTEM FOR IMPROVING PERFORMANCE AT DIFFERENT VIEWING ANGLES ASSOCIATED WITH DISPLAYING DIFFERENT HUMAN SKIN COLORS

(71) Applicant: HUIZHOU CHINA STAR OPTOELECTRONICS TECHNOLOGY CO., LTD., Huizhou (CN)

(72) Inventor: Yuecu Lin, Huizhou (CN)

( * ) Notice: Subject to any disclaimer, the term of this patent is extended or adjusted under 35 U.S.C. 154(b) by 464 days.

(21) Appl. No.: 16/615,136

(22) PCT Filed: Nov. 7, 2019

(86) PCT No.: PCT/CN2019/116230
§ 371 (c)(1),
(2) Date: Nov. 20, 2019

(87) PCT Pub. No.: WO2021/056700
PCT Pub. Date: Apr. 1, 2021

(65) Prior Publication Data

US 2022/0051601 A1 Feb. 17, 2022

(30) Foreign Application Priority Data

Sep. 25, 2019 (CN) ........................ 201910914049.0

(51) Int. Cl.
*G09G 3/20* (2006.01)

(52) U.S. Cl.
CPC ... *G09G 3/2003* (2013.01); *G09G 2320/0242* (2013.01); *G09G 2320/028* (2013.01); *G09G 2380/08* (2013.01)

(58) Field of Classification Search
None
See application file for complete search history.

(56) References Cited

U.S. PATENT DOCUMENTS 11,080,894 B2 * 8/2021 Du ......................... G06V 10/40
2010/0134694 A1 * 6/2010 Sakurai .................... H04N 9/67
348/E9.037

(Continued)

FOREIGN PATENT DOCUMENTS

CN 103106884 A 5/2013
CN 104376828 A 2/2015

(Continued)

*Primary Examiner* — Benjamin C Lee
*Assistant Examiner* — Emily J Frank
(74) *Attorney, Agent, or Firm* — JMB DAVIS BEN-DAVID

(57) ABSTRACT

A method and a system for improving a performance at different viewing angles associated with displaying different human skin colors are provided. Based on a V-T curve and an XYZ data of WRGB at different viewing angles are measured in a case of proportions of RGB being the same, by setting different proportions of the RGB, a V-T curve and an XYZ data of the WRGB at different viewing angles are simulated under the above proportions. By extracting a characteristic RGB grayscale value of an image to be improved associated with viewing angles, a performance of the characteristic RGB grayscale value at different viewing angles is simulated. The proportions of the RGB are constantly adjusted to meet specifications.

5 Claims, 2 Drawing Sheets

(56) References Cited

U.S. PATENT DOCUMENTS

| | | | | |
|---|---|---|---|---|
| 2010/0149227 | A1* | 6/2010 | Tomizawa ........... | G09G 3/3648 345/694 |
| 2010/0158363 | A1 | 6/2010 | Jiang et al. | |
| 2014/0218411 | A1* | 8/2014 | Chen .................... | G09G 3/3611 345/88 |
| 2015/0211987 | A1* | 7/2015 | Burg ...................... | G01N 21/78 356/402 |
| 2015/0325165 | A1* | 11/2015 | Mori .................... | G09G 3/2081 345/698 |
| 2016/0155415 | A1 | 6/2016 | Chen et al. | |
| 2017/0039915 | A1* | 2/2017 | Chen .................... | G09G 3/2018 |
| 2018/0075792 | A1 | 3/2018 | Chen et al. | |
| 2019/0266976 | A1* | 8/2019 | Wyble ..................... | G06F 3/147 |
| 2019/0272783 | A1* | 9/2019 | Huang ................. | G09G 3/2074 |
| 2020/0184642 | A1* | 6/2020 | Wang ..................... | A61B 5/445 |
| 2020/0342823 | A1* | 10/2020 | Wu ...................... | G09G 3/3696 |
| 2020/0355968 | A1* | 11/2020 | Lin ................... | G02F 1/133707 |
| 2021/0043128 | A1* | 2/2021 | Kubota .................. | B42D 25/47 |

FOREIGN PATENT DOCUMENTS

| | | | |
|---|---|---|---|
| CN | 104658504 | A | 5/2015 |
| CN | 109147712 | A | 1/2019 |
| CN | 109215599 | A | 1/2019 |

* cited by examiner

METHOD AND SYSTEM FOR IMPROVING PERFORMANCE AT DIFFERENT VIEWING ANGLES ASSOCIATED WITH DISPLAYING DIFFERENT HUMAN SKIN COLORS

FIELD OF DISCLOSURE

The present disclosure relates to the field of display technologies, and in particular, to a method and a system for improving a performance at different viewing angles associated with displaying different human skin colors.

BACKGROUND

At present, in the field of liquid crystal panel displays, a vertically aligned (VA) display mode has obvious disadvantages corresponding to viewing angles, such as a color shift at large viewing angle and a whitening phenomenon. Therefore, for the disadvantages corresponding to viewing angles of the VA display mode, an 8-domain pixel design has been proposed for improving a performance at different viewing angles. In the 8-domain pixel design, a pixel is divided into two parts, a main pixel and a sub-pixel. Different voltages and areas are provided to the main pixel and the sub-pixel, respectively, so that the main pixel and the sub-pixel display different grayscales. Through a spatial mixing, the performance at different viewing angles is improved. However, for different races with different skin colors, a performance at different viewing angles is different, and a display performance at different viewing angles varies greatly.

Accordingly, in the existing method and system corresponding to a performance at different viewing angles associated with displaying different human skin colors, there are large differences in display at different viewing angles.

SUMMARY OF DISCLOSURE

In the existing method and system corresponding to a performance at different viewing angles associated with displaying different human skin colors, there are large differences in display at different viewing angles.

The present disclosure provides a method and a system corresponding to a performance at different viewing angles associated with displaying different human skin colors, which can effectively reduce differences in display of different human skin colors at different viewing angles, so as to solve the technical problem with large differences in display at different viewing angles in the existing method and system corresponding to a performance at different viewing angles associated with displaying different human skin colors.

In order to solve the above problems, technical solutions provided by the present disclosure are as follows.

The present disclosure provides a method for improving a performance at different viewing angles associated with displaying different human skin colors, including following steps:

S10, acquiring a V-T curve of white, red, green, and blue colors (WRGB) and an XYZ value of each grayscale in each of pixels at each predetermined viewing angle in a case where proportions of red, green, and blue colors (RGB) in each of the pixels are the same, where the predetermined viewing angle includes a front viewing angle and a side viewing angle;

S20, resetting the proportions of the RGB in each of the pixels, and calculating a V-T curve of the WRGB and an XYZ value of each grayscale in each of the pixels at the predetermined viewing angle;

S30, calculating a luminance value of each grayscale in each of the pixels based on a gamma value is 2.2 at the front viewing angle under a predetermined voltage setting of 255-grayscale or a highest grayscale;

S40, performing a white balance adjustment for each of the pixels to acquire a grayscale value of each grayscale under a white balance condition;

S50, calculating a characteristic RGB grayscale value of a human skin color by a MatLAB software, and calculating an Yxy value of an image composed of the characteristic RGB grayscale value at the predetermined viewing angle; and

S60, calculating a difference value between an Yxy value of the image composed of the characteristic RGB grayscale value of the human skin color at the front viewing angle and another Yxy value of the image composed of the characteristic RGB grayscale value of the human skin color at the side viewing angle, and resetting the proportions of the RGB in each of the pixels according to a magnitude relationship between the difference value and a viewing angle specification value.

In the method for improving the performance at different viewing angles associated with displaying different human skin colors of the present disclosure, the S20 further includes:

S201, in each of the pixels, setting a proportion of an R sub-pixel to be p1, setting a proportion of a G sub-pixel to be p2, and setting a proportion of a B sub-pixel to be p3, where a sum of the p1, the p2, and the p3 is 1; and S202, calculating the V-T curve of the WRGB and the XYZ value of each grayscale in each of the pixels at the predetermined viewing angle after the proportions of the RGB in each of the pixels are reset according to the V-T curve of the WRGB in each pixel corresponding to each predetermined viewing angle when p1=p2=p3=1/3.

In the method for improving the performance at different viewing angles associated with displaying different human skin colors of the present disclosure, the S30 further includes:

S301, acquiring a luminance value of 0-grayscale in each of the pixels at the predetermined viewing angle according to an XYZ value of the 0-grayscale in each of the pixels at the predetermined viewing angle, and acquiring another luminance value of 255-grayscale in each of the pixels at the predetermined viewing angle according to an XYZ value of the 255-grayscale in each of the pixels at the predetermined viewing angle; and S302, calculating the luminance value of each grayscale in each of the pixels at the predetermined viewing angle according to a formula $$\frac{c-a}{b-a}=\left(\frac{n}{255}\right)^z,$$

where the a is the luminance value of the 0-grayscale of each of the pixels at the predetermined viewing angle, the b is the luminance value of the 255-grayscale in each of the pixels at the predetermined viewing angle, the n is a corresponding gray scale value in each of the pixels at the predetermined viewing angle, the z is the gamma value of 2.2, the c is the luminance value of each grayscale in each of the pixels at the predetermined viewing angle.

In the method for improving the performance at different viewing angles associated with displaying different human skin colors of the present disclosure, the S50 further includes:

S501, calculating the characteristic RGB grayscale value of the human skin color by the MatLAB software, and calculating an XYZ value of the characteristic RGB grayscale value of the human skin color at the predetermined viewing angle; and S502, calculating an Yxy value of the characteristic RGB grayscale value of the human skin color at the predetermined viewing angle according to the XYZ value of the characteristic RGB grayscale value of the human skin color at the predetermined viewing angle.

In the method for improving the performance at different viewing angles associated with displaying different human skin colors of the present disclosure, the S502 further includes:

S5021, calculating an x value and a y value according to the XYZ value of the characteristic RGB grayscale value of the human skin color at the predetermined viewing angle, where x=X/(X+Y+Z), y=Y/(X+Y+Z), the x value and the y value are color coordinate values, and the XYZ value includes X, Y, and Z; and S5022, obtaining the Yxy value of the characteristic RGB grayscale value of the human skin color at the predetermined viewing angle according to the x value, the y value, and the Y extracted from the XYZ value of the characteristic RGB grayscale value of the human skin color at the predetermined viewing angle.

In the method for improving the performance at different viewing angles associated with displaying different human skin colors of the present disclosure, in the S60, if the difference does not satisfy the viewing angle specification value, the proportions of the RGB in each of the pixels are adjusted, and the S20 to the S50 are repeated until the difference satisfies the viewing angle specification value; and if the difference satisfies the viewing angle specification value, no adjustment is performed.

The present disclosure also provides a system for improving a performance at different viewing angles associated with displaying different human skin colors. The system includes an acquisition unit, a setting unit, a first adjustment unit, a second adjustment unit, a computing unit, and a third adjustment unit.

The acquisition unit is configured to acquire a V-T curve of white, red, green, and blue colors (WRGB) and an XYZ value of each grayscale in each of pixels at each predetermined viewing angle in a case where proportions of red, green, and blue colors (RGB) in each of the pixels are the same, where the predetermined viewing angle includes a front viewing angle and a side viewing angle.

The setting unit is configured to reset the proportions of the RGB in each of the pixels, and calculate a V-T curve of the WRGB and an XYZ value of each grayscale in each of the pixels at the predetermined viewing angle.

The first adjustment unit is configured to calculate a luminance value of each grayscale in each of the pixels based on a gamma value is 2.2 at the front viewing angle under a predetermined voltage setting of 255-grayscale or a highest grayscale;

The second adjustment unit is configured to perform a white balance adjustment for each of the pixels to acquire a grayscale value of each grayscale under a white balance condition.

The computing unit is configured to calculate a characteristic RGB grayscale value of a human skin color by a MatLAB software, and calculate an Yxy value of an image composed of the characteristic RGB grayscale value at the predetermined viewing angle.

The third adjustment unit is configured to calculate a difference value between an Yxy value of the image composed of the characteristic RGB grayscale value of the human skin color at the front viewing angle and another Yxy value of the image composed of the characteristic RGB gray scale value of the human skin color at the side viewing angle, and reset the proportions of the RGB in each of the pixels according to a magnitude relationship between the difference value and a viewing angle specification value.

In the system for improving the performance at different viewing angles associated with displaying different human skin colors of the present disclosure, the setting unit is further configured to set a proportion of an R sub-pixel to be p1, set a proportion of a G sub-pixel to be p2, and set a proportion of a B sub-pixel to be p3 in each of the pixels, where a sum of the p1, the p2, and the p3 is 1.

The setting unit is further configured to calculate the V-T curve of the WRGB and the XYZ value of each gray scale in each of the pixels at the predetermined viewing angle after the proportions of the RGB in each of the pixels are reset according to the V-T curve of the WRGB in each pixel corresponding to each predetermined viewing angle when p1=p2=p3=1/3.

In the system for improving the performance at different viewing angles associated with displaying different human skin colors of the present disclosure, the first adjustment unit is further configured to acquire a luminance value of 0-grayscale in each of the pixels at the predetermined viewing angle according to an XYZ value of the 0-grayscale in each of the pixels at the predetermined viewing angle, and acquire another luminance value of 255-grayscale in each of the pixels at the predetermined viewing angle according to an XYZ value of the 255-grayscale in each of the pixels at the predetermined viewing angle.

The first adjustment unit is further configured to calculate the luminance value of each grayscale in each of the pixels at the predetermined viewing angle according to a formula $$\frac{c-a}{b-a} = \left(\frac{n}{255}\right)^z,$$

where the a is the luminance value of the 0-grayscale of each of the pixels at the predetermined viewing angle, the b is the luminance value of the 255-grayscale in each of the pixels at the predetermined viewing angle, the n is a corresponding grayscale value in each of the pixels at the predetermined viewing angle, the z is the gamma value of 2.2, the c is the luminance value of each grayscale in each of the pixels at the predetermined viewing angle.

In the system for improving the performance at different viewing angles associated with displaying different human skin colors of the present disclosure, the computing unit is further configured to calculate an x value and a y value according to the XYZ value of the characteristic RGB grayscale value of the human skin color at the predetermined viewing angle, where x=X/(X+Y+Z), y=Y/(X+Y+Z), the x value and the y value are color coordinate values, and the XYZ value includes X, Y, and Z.

The computing unit is further configured to obtain the Yxy value of the characteristic RGB grayscale value of the human skin color at the predetermined viewing angle according to the x value, the y value, and the Y extracted from the XYZ value of the characteristic RGB grayscale value of the human skin color at the predetermined viewing angle.

Advantages of the present disclosure are as follows. In the method for improving the performance at different viewing angles associated with displaying different human skin colors of the present disclosure, by adjusting the proportions the red sub-pixel, the green sub-pixel, and the blue sub-pixel in each pixel, the Yxy value of the characteristic RGB grayscale value of the human skin color at the front viewing angle and the Yxy value of the characteristic RGB grayscale value of the human skin color at the side viewing angle satisfy the preset specification value, so as to solve the technical problem with large differences in display of different human skin colors at different viewing angles in the prior art.

BRIEF DESCRIPTION OF DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
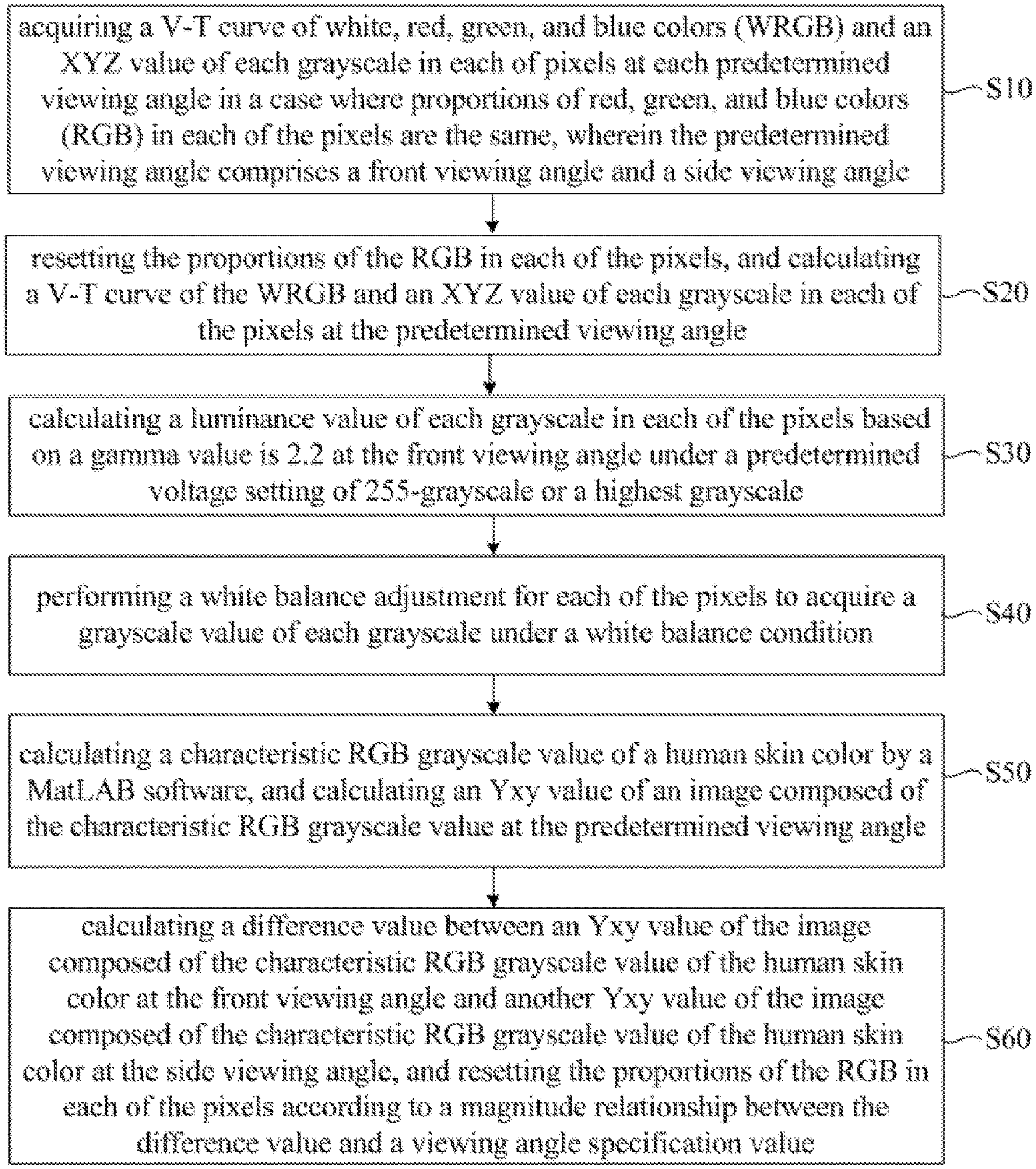
FIG. 1 is a flowchart of a method for improving a performance at different viewing angles associated with displaying different human skin colors of the present disclosure.

The following embodiments are referring to the accompanying drawings for exemplifying specific implementable embodiments of the present disclosure. Furthermore, directional terms described by the present disclosure, such as upper, lower, front, back, left, right, inner, outer, side and etc., are only directions by referring to the accompanying drawings, and thus the used directional terms are used to describe and understand the present disclosure, but the present disclosure is not limited thereto. In the drawings, similar structural units are designated by the same reference numerals.

In the existing method and system corresponding to a performance at different viewing angles associated with displaying different human skin colors, there are large differences in display at different viewing angles. Embodiments of the present disclosure can solve this disadvantage.

FIG. 1 is a flowchart of a method for improving a performance at different viewing angles associated with displaying different human skin colors of the present disclosure. The method includes the following steps.

In a step S10, a V-T curve of white, red, green, and blue colors (WRGB) and an XYZ value of each grayscale in each of pixels at each predetermined viewing angle are acquired in a case where proportions of red, green, and blue colors (RGB) in each of the pixels are the same. The predetermined viewing angle includes a front viewing angle and a side viewing angle Specifically, the step S10 further includes following.

Under 256-level predetermined voltages, the proportions of RGB in each pixel are the same, that is, a proportion of a red color (R) sub-pixel is set to ⅓, a proportion of a green color (G) sub-pixel is set to ⅓, and a proportion of blue color (B) sub-pixel is set to ⅓. In the 256-level predetermined voltages, each voltage corresponds to a different grayscale of white color (W), R, G, B. Each voltage also corresponds to tristimulus values (XYZ values) and a V-T (voltage-transmittance) curve of the W, R, G, and B at the predetermined viewing angle. Therefore, tristimulus values $X_0Y_0Z_0$ and a $V_0$-$T_0$ curve can be obtained by the proportions of the RGB are ⅓. It should be noted that for an 8-domain pixel whose parameters have been determined, a voltage is determined, and XYZ values at 90° and 45° are not the same. That is, brightness values are different when the viewing angles are different. Preferably, a front viewing angle is 90°, and a side viewing angle may be 30°, 45°, or 60°.

In a step S20, the proportions of the RGB in each of the pixels are reset, and a V-T curve of the WRGB and an XYZ value of each grayscale in each of the pixels at the predetermined viewing angle are calculated.

Specifically, the step S20 further includes following.

Under 256-level predetermined voltages, in each of the pixels at the predetermined viewing angle, a proportion of an R sub-pixel is set to be p1, a proportion of a G sub-pixel is set to be p2, and a proportion of a B sub-pixel is set to be p3. A sum of the p1, the p2, and the p3 is 1. Then, according to the tristimulus values $X_0Y_0Z_0$ and the $V_0$-$T_0$ curve, the V-T curve of WRGB and the XYZ value of each grayscale in each of the pixels are calculated at the predetermined viewing angle.

In a step S30, a luminance value of each grayscale in each of the pixels based on a gamma value is 2.2 at the front viewing angle is calculated under a predetermined voltage setting of 255-grayscale or a highest grayscale;

Specifically, the step S30 further includes following.

Firstly, a luminance value of 0-grayscale in each of the pixels at the predetermined viewing angle is acquired according to an XYZ value of the 0-grayscale in each of the pixels at the predetermined viewing angle, and a luminance value of 255-grayscale in each of the pixels at the predetermined viewing angle is acquired according to an XYZ value of the 255-grayscale in each of the pixels at the predetermined viewing angle. Then, the luminance value of each grayscale in each of the pixels at the predetermined viewing angle is calculated according to a formula $$\frac{c-a}{b-a}=\left(\frac{n}{255}\right)^{z},$$

where the a is the luminance value of the 0-grayscale of each of the pixels at the predetermined viewing angle, the b is the luminance value of the 255-grayscale in each of the pixels at the predetermined viewing angle, the n is a corresponding grayscale value in each of the pixels at the predetermined viewing angle, the z is the gamma value of 2.2, the c is the luminance value of each grayscale in each of the pixels at the predetermined viewing angle. The adjustment based on Gamma=2.2 is to make the brightness more uniform and suitable for human eyes.

In a step S40, a white balance adjustment for each of the pixels is performed to acquire a grayscale value of each grayscale under a white balance condition.

Specifically, the step S40 further includes following.

The white balance adjustment is performed for each of the pixels. On the one hand, it is required to satisfy the adjustment of the gamma value of 2.2, and on the other hand, color coordinate values x and y corresponding to other grayscales are required to be equal to color coordinate values x and y of 255-grayscale, respectively. Before the white balance adjustment is performed, the grayscale value of W is equal to the grayscale value of R, the grayscale value of G, and the grayscale value of B. After the white balance adjustment is performed, the grayscale value of W is not necessarily exactly equal to the grayscale value of R, the grayscale value of G, and the grayscale value of B.

In a step S50, a characteristic RGB grayscale value of a human skin color is calculated by a MatLAB software, and an Yxy value of an image composed of the characteristic RGB grayscale value at the predetermined viewing angle is calculated.

Specifically, the step S50 further includes following.

Firstly, RGB values of different regions of a colored people on an image are extracted by the MatLAB software, and the RGB values are averaged to obtain the XYZ value of the characteristic RGB of the human skin colors at the predetermined viewing angle. Then, an x value and a y value are calculated according to the XYZ value of the characteristic RGB grayscale value of the human skin color at the predetermined viewing angle, where $x=X/(X+Y+Z)$, $y=Y/(X+Y+Z)$, the x value and the y value are color coordinate values, and the XYZ value includes X, Y, and Z. Finally, the Yxy value of the characteristic RGB grayscale value of the human skin color at the predetermined viewing angle is obtained according to the x value, the y value, and the Y extracted from the XYZ value of the characteristic RGB grayscale value of the human skin color at the predetermined viewing angle.

In a step S60, a difference value between an Yxy value of the image composed of the characteristic RGB gray scale value of the human skin color at the front viewing angle and another Yxy value of the image composed of the characteristic RGB grayscale value of the human skin color at the side viewing angle is calculated, and the proportions of the RGB in each of the pixels are reset according to a magnitude relationship between the difference value and a viewing angle specification value.

Specifically, the step S60 further includes following.

The difference value between the Yxy value of the image composed of the characteristic RGB grayscale value of the human skin color at the front viewing angle and the Yxy value of the image composed of the characteristic RGB grayscale value of the human skin color at the side viewing angle is calculated. The proportions of the RGB in each of the pixels are reset according to the magnitude relationship between the difference value and a viewing angle specification value. If the difference does not satisfy the viewing angle specification value, the proportions of the RGB in each of the pixels are adjusted, and the step S20 to the step S50 are repeated until the difference satisfies the viewing angle specification value. If the difference satisfies the viewing angle specification value, no adjustment is performed.

Taking an image with a skin color of RGB=179/140/102 as an example, color coordinates of the image with the skin color at a front viewing angle are x0 and y0, and color coordinates of the image with the skin color at a side viewing angle of 30 degrees are x30 and y30. $\Delta x=x0-x30$ and $\Delta y=y0-y30$ are represented as changes of viewing angles for evaluating the image with the skin color, and the smaller the Δx and Δy, the better the viewing angle of image with the skin color. By changing an arrangement of the pixels, the proportions of RGB are adjusted from the original ⅓ to a proportion of an R sub-pixel be 0.375, a proportion of a G sub-pixel be 0.375, and a proportion of an B sub-pixel be 0.25.

Data as shown in Table 1 is obtained. It can be seen from Table 1 that the change in proportions of RGB causes Δx to change from 0.022 to 0.018, and Δy to change from 0.013 to 0.0025. Thus, a performance at different viewing angles associated with displaying the image with the skin color is improved. It can be seen that the performance at the viewing angle is greatly improved by the adjustment of the proportion of the B sub-pixel.

TABLE 1

| pixel arrangement | Δx | Δy |
|---|---|---|
| R = 1/3; G = 1/3; B = 1/3 | 0.022 | 0.013 |
| R = 3/8; G = 3/8; B = 1/4 | 0.018 | 0.0025 |

Figure 2:
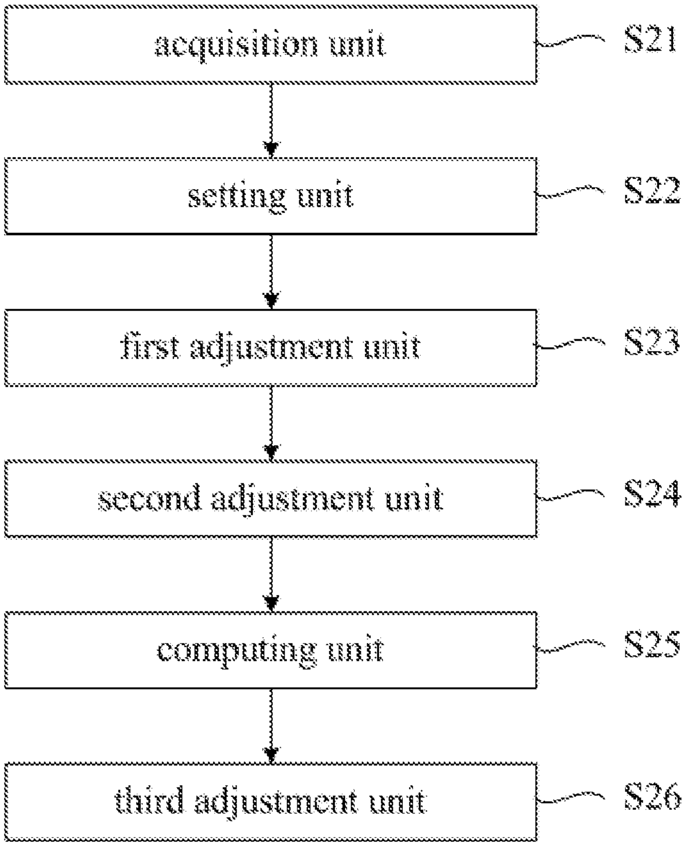
FIG. 2 is a block diagram of a system for improving a performance at different viewing angles associated with displaying different human skin colors of the present disclosure.

FIG. 2 is a block diagram of a system for improving a performance at different viewing angles associated with displaying different human skin colors of the present disclosure. The present disclosure also provides a system for improving a performance at different viewing angles associated with displaying different human skin colors. The system includes an acquisition unit 21, a setting unit 22, a first adjustment unit 23, a second adjustment unit 24, a computing unit 25, and a third adjustment unit.

Specifically, the acquisition unit 21 is configured to acquire a V-T curve of white, red, green, and blue colors (WRGB) and an XYZ value of each grayscale in each of pixels at each predetermined viewing angle in a case where proportions of red, green, and blue colors (RGB) in each of the pixels are the same. The predetermined viewing angle includes a front viewing angle and a side viewing angle.

Specifically, the setting unit 22 is configured to reset the proportions of the RGB in each of the pixels, and calculate a V-T curve of the WRGB and an XYZ value of each grayscale in each of the pixels at the predetermined viewing angle. Specifically, the setting unit is further configured to set a proportion of an R sub-pixel to be p1, set a proportion of a G sub-pixel to be p2, and set a proportion of a B sub-pixel to be p3 in each of the pixels. A sum of the p1, the p2, and the p3 is 1. The setting unit is further configured to calculate the V-T curve of the WRGB and the XYZ value of each grayscale in each of the pixels at the predetermined viewing angle after the proportions of the RGB in each of the pixels are reset according to the V-T curve of the WRGB in each pixel corresponding to each predetermined viewing angle when $p1=p2=p3=1/3$.

Specifically, the first adjustment unit 23 is configured to calculate a luminance value of each grayscale in each of the pixels based on a gamma value is 2.2 at the front viewing angle under a predetermined voltage setting of 255-grayscale or a highest grayscale. Specifically, the setting unit is further configured to set a proportion of an R sub-pixel to be p1, set a proportion of a G sub-pixel to be p2, and set a proportion of a B sub-pixel to be p3 in each of the pixels. A sum of the p1, the p2, and the p3 is 1. The setting unit is further configured to calculate the V-T curve of the WRGB and the XYZ value of each grayscale in each of the pixels at the predetermined viewing angle after the proportions of the RGB in each of the pixels are reset according to the V-T curve of the WRGB in each pixel corresponding to each predetermined viewing angle when $p1=p2=p3=1/3$.

Specifically, the second adjustment unit 24 is configured to perform a white balance adjustment for each of the pixels to acquire a grayscale value of each grayscale under a white balance condition.

Specifically, the computing unit 25 is configured to calculate a characteristic RGB grayscale value of a human skin color by a MatLAB software, and calculate an Yxy value of an image composed of the characteristic RGB grayscale value at the predetermined viewing angle. Specifically, the computing unit is further configured to calculate an x value and a y value according to the XYZ value of the characteristic RGB grayscale value of the human skin color at the predetermined viewing angle, where x=X/(X+Y+Z), y=Y/(X+Y+Z), the x value and the y value are color coordinate values, and the XYZ value includes X, Y, and Z. The computing unit is further configured to obtain the Yxy value of the characteristic RGB grayscale value of the human skin color at the predetermined viewing angle according to the x value, the y value, and the Y extracted from the XYZ value of the characteristic RGB grayscale value of the human skin color at the predetermined viewing angle.

Specifically, the third adjustment unit 26 is configured to calculate a difference value between an Yxy value of the image composed of the characteristic RGB grayscale value of the human skin color at the front viewing angle and another Yxy value of the image composed of the characteristic RGB grayscale value of the human skin color at the side viewing angle, and reset the proportions of the RGB in each of the pixels according to a magnitude relationship between the difference value and a viewing angle specification value.

If the difference does not satisfy the viewing angle specification value, the proportions of the RGB in each of the pixels are adjusted by the third adjustment unit 26, and then the setting unit 22, the first adjustment unit 23, the second adjustment unit 24, and the computing unit 25 process until the difference satisfies the viewing angle specification value. If the difference satisfies the viewing angle specification value, no adjustment is performed.

In the present disclosure, based on a V-T curve and an XYZ data of full-grayscale at different viewing angles in a normal pixel arrangement of RGB, by setting different proportions of RGB, the V-T and the XYZ data of WRGB of full-grayscale at different viewing angles under the above proportions are simulated. Then, by extracting a characteristic RGB grayscale value of an image to be improved, performances of the characteristic RGB at different viewing angles are simulated. By adjusting the proportions of RGB in different pixels, the performance associated with viewing angles of the desired improved image can be improved to meet specifications, which can effectively improve the performance at different viewing angles associated with displaying different human skin colors.

Advantages of the present disclosure are as follows. In the method for improving the performance at different viewing angles associated with displaying different human skin colors of the present disclosure, by adjusting the proportions the red sub-pixel, the green sub-pixel, and the blue sub-pixel in each pixel, the Yxy value of the characteristic RGB grayscale value of the human skin color at the front viewing angle and the Yxy value of the characteristic RGB grayscale value of the human skin color at the side viewing angle satisfy the preset specification value, so as to solve the technical problem with large differences in display of different human skin colors at different viewing angles in the prior art.

The present disclosure has been described with preferred embodiments thereof and it is understood that many changes and modifications to the described embodiments can be carried out without departing from the scope and the spirit of the disclosure that is intended to be limited only by the appended claims.

What is claimed is:

1. A method for improving a performance at different viewing angles associated with displaying different human skin colors at a display, comprising following steps:

setting proportions of red, green, and blue colors (RGB) in each of pixels being the same under 256-level predetermined voltages, and acquiring a voltage-transmittance (V-T) curve of white, red, green, and blue colors (WRGB) and an XYZ value of each grayscale in each of the pixels at each predetermined viewing angle in a case where the proportions of RGB in each of the pixels are the same, wherein the predetermined viewing angle comprises a front viewing angle and a side viewing angle, wherein the XYZ value is a tristimulus value;

resetting the proportions of the RGB in each of the pixels under the 256-level predetermined voltages, and calculating a V-T curve of the WRGB and an XYZ value of each grayscale in each of the pixels at the predetermined viewing angle;

calculating a luminance value of each grayscale in each of the pixels based on a gamma value is 2.2 at the front viewing angle under a predetermined voltage setting of 255-grayscale or a highest grayscale;

performing a white balance adjustment for each of the pixels to acquire a grayscale value of each grayscale under a white balance condition, wherein color coordinate values x and y corresponding to grayscales are equal to color coordinate values x and y of 255-grayscale;

calculating a characteristic RGB grayscale value of a human skin color by a MatLAB® software, and calculating an Yxy value of an image composed of the characteristic RGB grayscale value at the predetermined viewing angle; and calculating a difference value between an Yxy value of the image composed of the characteristic RGB grayscale value of the human skin color at the front viewing angle and another Yxy value of the image composed of the characteristic RGB grayscale value of the human skin color at the side viewing angle, and resetting the proportions of the RGB in each of the pixels according to a magnitude relationship between the difference value and a viewing angle specification value until the difference value satisfies the viewing angle specification value;

wherein the step of resetting the proportions of the RGB in each of the pixels under the 256-level predetermined voltages, and calculating the V-T curve of the WRGB and an XYZ value of each grayscale in each of the pixels at the predetermined viewing angle further comprises:

in each of the pixels, setting a proportion of an R sub-pixel to be p1, setting a proportion of a G sub-pixel to be p2, and setting a proportion of a B sub-pixel to be p3, wherein a sum of the p1, the p2, and the p3 is 1; and calculating the V-T curve of the WRGB and the XYZ value of each grayscale in each of the pixels at the predetermined viewing angle after the proportions of the RGB in each of the pixels are reset according to the V-T curve of the WRGB in each pixel corresponding to each predetermined viewing angle when p1=p2=p3=1/3.

2. The method for improving the performance at different viewing angles associated with displaying different human skin colors as claimed in claim 1, wherein the step of calculating the luminance value of each grayscale in each of the pixels based on the gamma value is 2.2 at the front viewing angle under the predetermined voltage setting of 255-grayscale or the highest grayscale further comprises:

acquiring a luminance value of 0-grayscale in each of the pixels at the predetermined viewing angle according to an XYZ value of the 0-grayscale in each of the pixels at the predetermined viewing angle, and acquiring another luminance value of 255-grayscale in each of the pixels at the predetermined viewing angle according to an XYZ value of the 255-grayscale in each of the pixels at the predetermined viewing angle; and calculating the luminance value of each grayscale in each of the pixels at the predetermined viewing angle according to a formula $$\frac{c-a}{b-a}=\left(\frac{n}{255}\right)^{z},$$

wherein the a is the luminance value of the 0-grayscale of each of the pixels at the predetermined viewing angle, the b is the luminance value of the 255-grayscale in each of the pixels at the predetermined viewing angle, the n is a corresponding grayscale value in each of the pixels at the predetermined viewing angle, the z is the gamma value of 2.2, the c is the luminance value of each grayscale in each of the pixels at the predetermined viewing angle.

3. The method for improving the performance at different viewing angles associated with displaying different human skin colors as claimed in claim 1, wherein the step of calculating the characteristic RGB grayscale value of the human skin color by the MatLAB® software, and calculating an Yxy value of an image composed of the characteristic RGB grayscale value at the predetermined viewing angle further comprises:

calculating the characteristic RGB grayscale value of the human skin color by the MatLAB® software, and calculating an XYZ value of the characteristic RGB grayscale value of the human skin color at the predetermined viewing angle; and calculating an Yxy value of the characteristic RGB grayscale value of the human skin color at the predetermined viewing angle according to the XYZ value of the characteristic RGB grayscale value of the human skin color at the predetermined viewing angle.

4. The method for improving the performance at different viewing angles associated with displaying different human skin colors as claimed in claim 3, wherein the step of calculating the Yxy value of the characteristic RGB grayscale value of the human skin color at the predetermined viewing angle according to the XYZ value of the characteristic RGB grayscale value of the human skin color at the predetermined viewing angle further comprises:

calculating an x value and a y value according to the XYZ value of the characteristic RGB grayscale value of the human skin color at the predetermined viewing angle, wherein $x=X/(X+Y+Z)$, $y=Y/(X+Y+Z)$, the x value and the y value are color coordinate values, and the XYZ value comprises X, Y, and Z; and obtaining the Yxy value of the characteristic RGB grayscale value of the human skin color at the predetermined viewing angle according to the x value, the y value, and the Y extracted from the XYZ value of the characteristic RGB grayscale value of the human skin color at the predetermined viewing angle.

5. The method for improving the performance at different viewing angles associated with displaying different human skin colors as claimed in claim 1, wherein in the step of calculating the difference value between the Yxy value of the image composed of the characteristic RGB grayscale value of the human skin color at the front viewing angle and another Yxy value of the image composed of the characteristic RGB grayscale value of the human skin color at the side viewing angle, and resetting the proportions of the RGB in each of the pixels according to the magnitude relationship between the difference value and the viewing angle specification value, if the difference does not satisfy the viewing angle specification value, the proportions of the RGB in each of the pixels are adjusted, and the step of resetting the proportions of the RGB in each of the pixels, and calculating a V-T curve of the WRGB and the XYZ value of each grayscale in each of the pixels at the predetermined viewing angle to the step of calculating the Yxy value of the characteristic RGB grayscale value of the human skin color at the predetermined viewing angle according to the XYZ value of the characteristic RGB grayscale value of the human skin color at the predetermined viewing angle are repeated until the difference satisfies the viewing angle specification value; and if the difference satisfies the viewing angle specification value, no adjustment is performed.

* * * * *